Nov. 29, 1955 J. A. W. MILLS ET AL 2,724,865

MULTI-CAVITY MOULDS

Filed March 18, 1952 2 Sheets-Sheet 1

Inventors
Joseph A. W. Mills
Harold A. Drew
Alec D. Cheesman
By Reynolds, Beach & Christensen
Attorneys Nov. 29, 1955 J. A. W. MILLS ET AL 2,724,865
MULTI-CAVITY MOULDS
Filed March 18, 1952 2 Sheets-Sheet 2
10 11
FIG. 2.
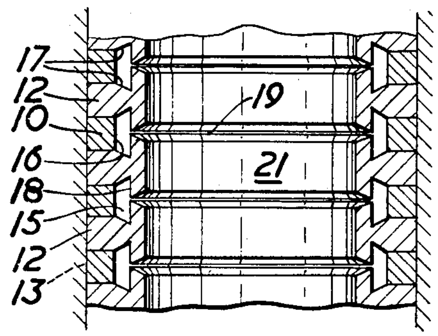
FIG. 3.
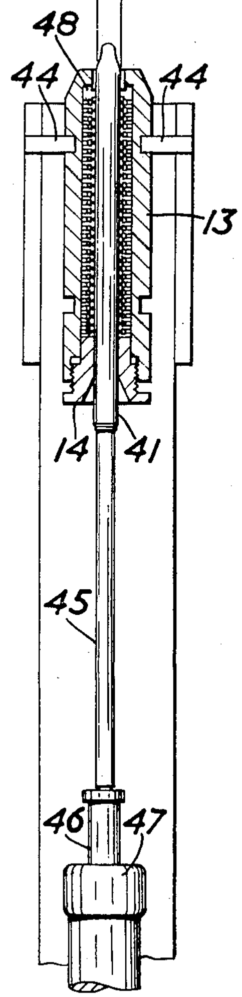
FIG. 4.
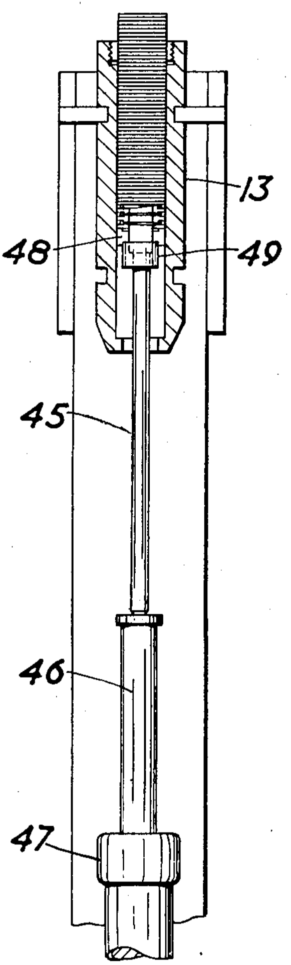
FIG. 5.
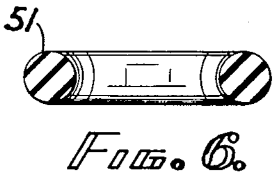
FIG. 6.
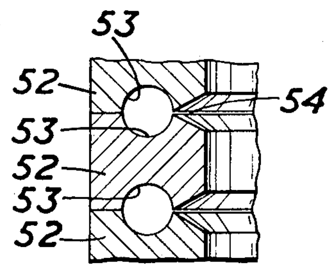
FIG. 7.
Inventors
Joseph A. W. Mills
Harold A. Drew
Alec D. Chesmer
By Reynolds, Beach & Christensen
Attorneys United States Patent Office 2,724,865

Patented Nov. 29, 1955

2,724,865

MULTI-CAVITY MOULDS

Joseph A. W. Mills, Leckhampton, Harold A. Drew, Tewkesbury, and Alec D. Chesmer, Cheltenham, England, assignors to Dowty Seals Limited, Cheltenham, England Application March 18, 1952, Serial No. 277,246

Claims priority, application Great Britain March 22, 1951

6 Claims. (Cl. 18—42)

This invention relates to the production from mouldable material of sealing rings or like open-shaped members, and more particularly to multi-cavity moulds for use in such production.

One object of the invention is to provide improved injection moulding apparatus for such ring-shaped members wherein a plurality of mould cavities are arranged coaxially in a cylindrical body or other housing.

A further object is to provide injection moulding apparatus in accordance with the preceding object, particularly for use in moulding packing rings, wherein moulding flash is minimized and can be disposed on an inoperative face of the sealing ring.

The invention is illustrated, by way of example, in the accompanying drawings, of which—

Figure 2 is a sectional view of the form of composite packing ring to be moulded in the apparatus;

Figure 3 is a sectional view on an enlarged scale of a portion of the multi-cavity mould in Figure 1;

Figures 4 and 5 are diagrams showing the steps of separating the finished products from the mould;

Figure 6 shows another form of packing ring which can be made by the moulding apparatus; and Figure 7 is an enlarged detail showing the form of shaped annuli for use in the production of packing rings of the kind shown in Figure 6.

Figure 1:
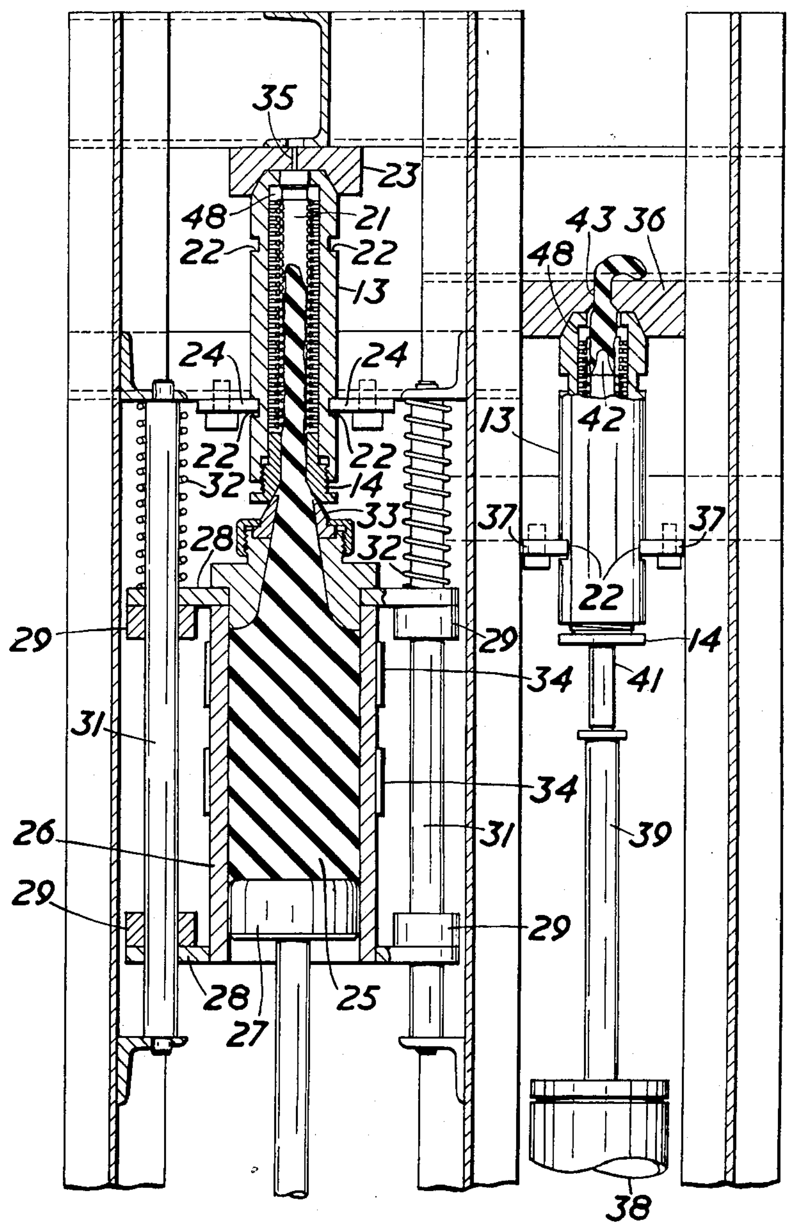
Figure 1 is an elevation, partly in section of two-stage moulding apparatus for the production of composite packing rings.

The composite packing ring shown in Figure 2 is of the kind described and illustrated in U. S. A. Letters Patent to George H. Dowty, Patent No. 2,455,982, and comprises an outer rigid component or confining ring 10, bonded to an inner resilient component or ring of packing material 11 which is trapezoidal in shape. The mould for the production of these rings is formed by a number of shaped annular mould elements 12, hereinafter referred to as shaped annuli, which are assembled in a stack with confining rings 10 placed alternately between them, see Figure 3. Each confining ring 10 is coated on its internal surface with a bonding agent for uniting the metal to the resilient packing material. The stack of shaped annuli 12 and confining rings 10 is mounted within a housing formed as a cylindrical body 13, see Figure 1, and is clamped therein by a hollow closure plug 14. It will be seen that each mould cavity 15 corresponds in shape to the rubber component of the packing ring and comprises an outer wall 16 formed by the confining ring 10, side walls 17 formed by the shaped annuli 12 on opposite sides of the cavity 15, and an inner wall 18 formed by axially flanged portions of these annuli. An annular entry throat 19 opens from the central space 21 within the stack, into the mould cavity 15 at the centre of the inner cylindrical wall 18. This throat 19 is formed by a circumferentially continuous narrow gap between the axial flanges of adjacent annuli 12 and it is tapered in shape by bevelling the adjacent edges of the flanges. An advantage of forming a stack in this way is that the sharp corners of the resiliently deformable rubber component of the packing ring, are formed with precision inside the angular shaped parts defining the cavity.

The cylindrical body 13 has transverse grooves 22 cut in its outer surface to enable it to be supported during the various operations. In the first operation shown on the left hand side of Figure 1, the body 13 is supported against the block 23 by means of pivoted arms 24 which are turned inwardly to engage one pair of grooves 22 in the body. Uncured rubber mix 25 contained in a charging cylinder 26 is arranged to be injected into the central space 21 of the mould by a power-operated piston 27. The charging cylinder 26 is supported at each end by plates 28 on which guide bushes 29 are fixed to provide a slidable mounting for the cylinder 26 on guide rods 31 which lie parallel to the axes of the cylinder 26. Coil springs 32 are mounted on the guide rods 31 and act downwardly against the upper plate 28 to provide a bias load on the charging cylinder 26 in the direction away from the mould body 13. The charging cylinder 26 has a nozzle 33 in its upper part which is engageable with the closure plug 14.

The rubber mix 25 is kept in a suitably soft condition for injection by means of strip heaters 34 which are applied to the outside of the charging cylinder 36. When the piston 27 is raised under power, the charging cylinder 26 is first raised on its guide rods 31 until the nozzle 33 engages the hollow closure plug 14, and thereafter continued elevation of the piston 27 injects the rubber mix into the central space 21 of the multicavity mould, the latter being heated prior to injection. The block 23 has a small hole 35 formed in it to vent the central space 21, and the size of this hole 35 is selected to give a suitable injection pressure within the mould space 21. The injection of rubber mix is stopped when the mix starts to extrude through the vent hole 35 in the block 23, and thereupon pressure on the piston 27 is reversed, causing the charging cylinder 26 to withdraw to its lowest position on the guides 31 while the column of rubber mix is severed at the entry to the closure plug 14.

The mould body 13 is then transferred to the press unit on the right hand side of Figure 1 where it is secured against a block 36 by pivoted arms 37 which engage one pair of grooves 22 in the mould body. This unit on the right hand side of Figure 1 where it is seton rod 39 which serves to force a mandrel 41 upwardly through the central space 21 of the mould assembly. This mandrel has a specially shaped end portion 42, approximately of tapered form, which is introduced through the hollow closure plug 14, while the outer diameter of the mandrel 41 has a clearance fit within the stack of shaped annuli 12 within the mould body 13. The shaped end portion 42 of the mandrel 41 provides a wedging action on the rubber mix which is situated between it and the shaped annuli 12, and thereby serves to force the mouldable material through the several annular throats 19 into the corresponding mould cavities 15 to fill the latter completely. The block 36 has an extrusion orifice 43 of predetermined size so as to provide controlled resistance to the discharge of superfluous mouldable material therethrough by the mandrel 41. The superfluous mouldable material is recovered for further use.

The mould assembly is then removed from the press unit and is transferred to a curing oven wherein the mouldable material is vulcanized by heat and united with the confining rings 10 by virtue of the bonding agent on the latter.

At the next stage of operation, the mould assembly is transferred to the press unit shown diagrammatically in Figure 4 wherein it is held fixed by arms 44. A rod 45 of lesser diameter than the mandrel 41 is placed between the mandrel 41 and the piston rod 46 of a ram 47 at the base of the unit, and when the piston rod 46 is raised by ram pressure the rod 46 forces the mandrel out of the mould body 13. At the final stage, the hollow closure plug 14 is unscrewed from the mould body 13 and the latter is inverted in the press unit as shown in Figure 5.

It will be observed that a backing ring 48 is included in the pack of shaped annuli 12 at the end remote from the closure plug 14, while a collar 49 placed on the end of the rod 45 is shaped to enter into locating engagement with the backing ring 48. When the piston rod 46 is raised, the rod 45 acting through the collar 49 and backing ring 48, ejects the stack of shaped annuli from the mould body 13. The shaped annuli 12 will then readily separate from the packing rings, while the rubber component of each packing ring has a sprue of moulded material in a position corresponding to the annular entry throat 19 which is narrowest at its junction with the rubber component so that it can be readily pulled away to give the final product. There will generally be a small flash or separation line but this is disposed at the centre of the inner face of the rubber component and will therefore not interfere with the action of the axially separated sealing faces.

The mould assembly may be modified to produce ring-shaped members of other forms, for example, the O-rings 51 of Figure 6. For the production of these, shaped annular mould elements 52 are employed each having a recess 53 of semi-circular section formed on opposite sides so that the recesses 53 of adjacent annuli 52 together form a ring-shaped cavity of circular cross-section. The adjacent inner edges of these annuli are bevelled to provide tapered entry throats 54 through which mouldable material may be injected to form O-rings by the same stages as described in the previous example. The final product will have a single separation line on its inner surface, as distinct from O-rings which are flash moulded by conventional methods and accordingly have moulding flashes on both the outer and inner surfaces.

We claim:

1. A multi-cavity mould for use in moulding ring-shaped members, comprising a plurality of annular mould elements stacked one upon another in succession, with their end faces in contact, to leave a central space within the stack, each mould element being annularly indented in each end face to form, in cooperation with the adjoining indented faces of each adjacent mould element, individual mould cavities and an annular entrance throat converging from the central space within the stack to a circumferentially continuous gap of narrowest width at the inner wall of each mould cavity, disposed between the axial extremities of each such cavity, whereby this narrow entrance throat forms an interconnecting flash, during moulding, of such thinness that the sprue formed therewithin can be readily separated from the finished moulded product formed within the mould cavity, and means to retain the several mould elements in stacked relationship against pressure within the cavities tending to separate them.

2. A multi-cavity mould as in claim 1, wherein the indentation in each end face of each mould element includes an annular groove located intermediate the element's inner and outer peripheral surfaces, and complemental in shape to the same groove in the adjoining face of the next mould element to define therewith the mould cavity, so much of the end faces of such mould elements as lies outwardly of the respective grooves being in full face contact in the stack, but the inner margin of each groove stopping short of the inner margin of the complemental groove entirely about such margins, to define between them the annular entrance throat.

3. A multi-cavity mould as in claim 1, wherein each indentation in each end face of each mould element is shaped, in cross-section, with an inner wall directed axially from the entrance throat, a bottom wall directed outwardly along a line at an acute angle to said inner wall, and with an outer, generally axially disposed inner wall.

4. A multi-cavity mould as in claim 1, wherein each annular indentation is substantially semi-circular in cross-section, the entrance throat being located along the circle of smallest diameter of the mould cavity.

5. A multi-cavity mould constructed as in claim 1, for use in moulding the resilient component of a composite packing ring which has an outer rigid component and a resilient inner component bonded to the outer rigid component, wherein each end face of each annular mould element is grooved annularly, adjoining and immediately outwardly of its cavity-forming annular indentation, to define in cooperation with the similarly grooved adjoining end face of the next adjacent mould elements an annular space of a size to be filled exactly by the outer rigid component of the composite packing ring, which when thus seated in said annular space closes the outer side of the annular mould cavity for the resilient inner component of the composite packing ring.

6. A multi-cavity mould as in claim 5, wherein each mould cavity is shaped, in cross-section, with two bottom walls directed from the respectively adjacent corners of the rigid outer component radially inwardly and axially diverging, and an inner wall directed axially in a straight line and disposed at an acute angle to each of the two bottom walls, and with the annular entrance throat interrupting said straight inner wall substantially midway between such acute angles.

References Cited in the file of this patent

UNITED STATES PATENTS

| | | |
|---|---|---|
| 1,658,567 | MacDonald | Feb. 7, 1928 |
| 2,187,165 | Lord | Jan. 16, 1940 |
| 2,476,558 | Moxness | July 19, 1949 |